(12) United States Patent
Spiegel et al.

(10) Patent No.: US 12,718,206 B2
(45) Date of Patent: Aug. 25, 2026

(54) MESSAGE PROCESSOR WITH APPLICATION PROMPTS

(71) Applicant: Snap Inc., Santa Monica, CA (US)

(72) Inventors: Evan Spiegel, Los Angeles, CA (US); William Wu, Marina del Rey, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/325,658

(22) Filed: May 20, 2021

(65) Prior Publication Data

US 2021/0342796 A1 Nov. 4, 2021

Related U.S. Application Data

(63) Continuation of application No. 15/868,909, filed on Jan. 11, 2018, now Pat. No. 11,017,363, which is a continuation of application No. 14/466,940, filed on Aug. 22, 2014, now Pat. No. 10,055,717.

(51) Int. Cl.

| | |
|---|---|
| ***G06Q 20/10*** | (2012.01) |
| ***G06F 7/02*** | (2006.01) |
| ***G06Q 20/32*** | (2012.01) |
| ***G06Q 20/42*** | (2012.01) |
| ***G06Q 30/00*** | (2023.01) |

(52) U.S. Cl.

CPC ............... *G06Q 20/10* (2013.01); *G06F 7/02* (2013.01); *G06Q 20/3224* (2013.01); *G06Q 20/42* (2013.01); *G06Q 30/00* (2013.01)

(58) Field of Classification Search

CPC ........ G06Q 20/10; G06Q 20/32; G06Q 20/42; G06Q 20/3224; G06Q 30/00; G06F 7/02

See application file for complete search history.

(56) References Cited

U.S. PATENT DOCUMENTS

| | | | |
|---|---|---|---|
| 5,999,932 | A | 12/1999 | Paul |
| 6,154,764 | A | 11/2000 | Nitta et al. |
| 6,167,435 | A | 12/2000 | Druckenmiller et al. |
| 6,204,840 | B1 | 3/2001 | Petelycky et al. |
| 6,216,141 | B1 | 4/2001 | Straub et al. |
| 6,310,694 | B1 | 10/2001 | Okimoto et al. |
| 6,484,196 | B1 | 11/2002 | Maurille |

(Continued)

FOREIGN PATENT DOCUMENTS

| | | | |
|---|---|---|---|
| CA | 2887596 | A1 | 7/2015 |
| EP | 2287567 | A1 | 2/2011 |

(Continued)

OTHER PUBLICATIONS

F. Cheng, "A Trusted Smart Phone and its Applications in Electronic Payment," 2010 International Forum on Information Technology and Applications, 2010, pp. 405-408, doi: 10.1109/IFITA.2010.256. (Year: 2010).*

(Continued)

*Primary Examiner* — Elda G Milef

(74) *Attorney, Agent, or Firm* — Schwegman Lundberg & Woessner, P.A.

(57) ABSTRACT

A computer implemented method includes identifying a special character in a message generated by a sender. A money transfer prompt is supplied to the sender in response to the special character. A transfer amount is validated. An account transfer for the transfer amount is initiated. The message is sent to a recipient with indicia of the account transfer.

18 Claims, 7 Drawing Sheets

(56) References Cited

U.S. PATENT DOCUMENTS 6,665,531 B1 12/2003 Soderbacka et al.
6,724,403 B1 4/2004 Santoro et al.
6,757,713 B1 6/2004 Ogilvie et al.
6,898,626 B2 5/2005 Ohashi
7,004,394 B2 2/2006 Kim
7,124,164 B1 10/2006 Chemtob
7,149,893 B1 12/2006 Leonard et al.
7,203,380 B2 4/2007 Chiu et al.
7,243,163 B1 7/2007 Friend et al.
7,356,564 B2 4/2008 Hartselle et al.
7,519,670 B2 4/2009 Hagale et al.
7,856,449 B1 12/2010 Martino et al.
8,001,204 B2 8/2011 Burtner et al.
8,098,904 B2 1/2012 Ioffe et al.
8,112,716 B2 2/2012 Kobayashi
8,276,092 B1 9/2012 Narayanan et al.
8,279,319 B2 10/2012 Date
8,312,086 B2 11/2012 Velusamy et al.
8,312,097 B1 11/2012 Siegel et al.
8,332,314 B2 * 12/2012 Griffin .................. G06Q 20/42 705/40
8,379,130 B2 2/2013 Forutanpour et al.
8,405,773 B2 3/2013 Hayashi et al.
8,418,067 B2 4/2013 Cheng et al.
8,428,453 B1 4/2013 Spiegel et al.
8,471,914 B2 6/2013 Sakiyama et al.
8,472,985 B2 * 6/2013 Karmarkar ........ H04M 1/72454 370/522
8,560,612 B2 10/2013 Kilmer et al.
8,687,021 B2 4/2014 Bathiche et al.
8,744,523 B2 6/2014 Fan et al.
8,775,407 B1 7/2014 Huang
8,775,972 B2 7/2014 Spiegel
8,788,680 B1 7/2014 Naik
8,797,415 B2 8/2014 Arnold
8,856,349 B2 10/2014 Jain et al.
8,914,752 B1 12/2014 Spiegel
9,026,943 B1 5/2015 Spiegel
9,083,770 B1 7/2015 Drose et al.
9,098,832 B1 8/2015 Scardino
9,225,897 B1 12/2015 Sehn et al.
9,237,202 B1 1/2016 Sehn
9,276,886 B1 3/2016 Samaranayake
9,396,354 B1 7/2016 Murphy et al.
9,407,712 B1 8/2016 Sehn
9,407,816 B1 8/2016 Sehn
9,702,711 B2 7/2017 Tang et al.
10,055,717 B1 8/2018 Spiegel et al.
11,017,363 B1 5/2021 Spiegel et al.
2002/0047868 A1 4/2002 Miyazawa
2002/0122659 A1 9/2002 Mcgrath et al.
2002/0144154 A1 10/2002 Tomkow
2003/0016247 A1 1/2003 Lai et al.
2003/0052925 A1 3/2003 Daimon et al.
2003/0126215 A1 7/2003 Udell
2003/0164856 A1 9/2003 Prager et al.
2004/0027371 A1 2/2004 Jaeger
2004/0111467 A1 6/2004 Willis
2004/0203959 A1 10/2004 Coombes
2004/0243531 A1 12/2004 Dean
2005/0078804 A1 4/2005 Yomoda
2005/0097176 A1 5/2005 Schatz et al.
2005/0104976 A1 5/2005 Currans
2005/0114783 A1 5/2005 Szeto
2005/0122405 A1 6/2005 Voss et al.
2005/0193340 A1 9/2005 Amburgey et al.
2005/0193345 A1 9/2005 Klassen et al.
2005/0198128 A1 9/2005 Anderson
2005/0223066 A1 10/2005 Buchheit et al.
2006/0114338 A1 6/2006 Rothschild
2006/0270419 A1 11/2006 Crowley et al.
2007/0040931 A1 2/2007 Nishizawa
2007/0064899 A1 3/2007 Boss et al.
2007/0073823 A1 3/2007 Cohen et al.
2007/0082707 A1 4/2007 Flynt et al.
2007/0192128 A1 8/2007 Celestini
2007/0214216 A1 9/2007 Carrer et al.
2007/0233801 A1 10/2007 Eren et al.
2007/0243887 A1 10/2007 Bandhole et al.
2007/0255456 A1 11/2007 Funayama
2008/0025701 A1 1/2008 Ikeda
2008/0033930 A1 2/2008 Warren
2008/0055269 A1 3/2008 Lemay et al.
2008/0104503 A1 5/2008 Beall et al.
2008/0207176 A1 8/2008 Brackbill et al.
2008/0222545 A1 9/2008 Lemay
2008/0256446 A1 10/2008 Yamamoto
2008/0266421 A1 10/2008 Takahata et al.
2008/0270938 A1 10/2008 Carlson
2008/0313346 A1 12/2008 Kujawa et al.
2009/0006565 A1 1/2009 Velusamy et al.
2009/0015703 A1 1/2009 Kim et al.
2009/0024956 A1 1/2009 Kobayashi
2009/0040324 A1 2/2009 Nonaka
2009/0042588 A1 2/2009 Lottin et al.
2009/0058822 A1 3/2009 Chaudhri
2009/0079846 A1 3/2009 Chou
2009/0132453 A1 5/2009 Hangartner et al.
2009/0132665 A1 5/2009 Thomsen et al.
2009/0160970 A1 6/2009 Fredlund et al.
2009/0222770 A1 9/2009 Chang
2009/0265647 A1 10/2009 Martin et al.
2010/0063891 A1 3/2010 Townsend et al.
2010/0082693 A1 4/2010 Hugg et al.
2010/0131880 A1 5/2010 Lee et al.
2010/0131895 A1 5/2010 Wohlert
2010/0156933 A1 6/2010 Jones et al.
2010/0159944 A1 6/2010 Pascal et al.
2010/0161831 A1 6/2010 Haas et al.
2010/0185665 A1 7/2010 Horn et al.
2010/0214436 A1 8/2010 Kim et al.
2010/0223128 A1 9/2010 Dukellis et al.
2010/0223343 A1 9/2010 Bosan et al.
2010/0257196 A1 10/2010 Waters et al.
2010/0281045 A1 11/2010 Dean
2010/0306669 A1 12/2010 Della Pasqua
2011/0004071 A1 1/2011 Faiola et al.
2011/0010619 A1 1/2011 Brown
2011/0040783 A1 2/2011 Uemichi et al.
2011/0040804 A1 2/2011 Peirce et al.
2011/0050909 A1 3/2011 Ellenby et al.
2011/0050915 A1 3/2011 Wang et al.
2011/0102630 A1 5/2011 Rukes
2011/0141025 A1 6/2011 Tsai
2011/0145564 A1 6/2011 Moshir et al.
2011/0161427 A1 6/2011 Fortin et al.
2011/0197194 A1 8/2011 D'Angelo et al.
2011/0202968 A1 8/2011 Nurmi
2011/0211534 A1 9/2011 Schmidt et al.
2011/0213845 A1 9/2011 Logan et al.
2011/0273575 A1 11/2011 Lee
2011/0283188 A1 11/2011 Farrenkopf
2011/0286586 A1 11/2011 Saylor et al.
2011/0320373 A1 12/2011 Lee et al.
2012/0028659 A1 2/2012 Whitney et al.
2012/0062805 A1 3/2012 Candelore
2012/0108293 A1 5/2012 Law et al.
2012/0110096 A1 5/2012 Smarr et al.
2012/0113143 A1 5/2012 Adhikari et al.
2012/0113272 A1 5/2012 Hata
2012/0131507 A1 5/2012 Sparandara et al.
2012/0131512 A1 5/2012 Takeuchi et al.
2012/0143760 A1 * 6/2012 Abulafia ................ G06Q 20/10 235/380
2012/0150978 A1 6/2012 Monaco
2012/0163664 A1 6/2012 Zhu
2012/0166971 A1 6/2012 Sachson et al.
2012/0169855 A1 7/2012 Oh
2012/0173991 A1 7/2012 Roberts et al.
2012/0176401 A1 7/2012 Hayward et al.
2012/0184248 A1 7/2012 Speede
2012/0200743 A1 8/2012 Blanchflower et al.
2012/0210244 A1 8/2012 De Francisco et al.
2012/0212632 A1 8/2012 Mate et al.

(56) References Cited

U.S. PATENT DOCUMENTS

2012/0220264 A1 8/2012 Kawabata
2012/0233000 A1 9/2012 Fisher et al.
2012/0236162 A1 9/2012 Imamura
2012/0239542 A1* 9/2012 Preston .................. G06Q 30/06 705/35
2012/0239761 A1 9/2012 Linner et al.
2012/0250951 A1 10/2012 Chen
2012/0278387 A1 11/2012 Garcia et al.
2012/0278692 A1 11/2012 Shi
2012/0281129 A1 11/2012 Wang et al.
2012/0299954 A1 11/2012 Wada et al.
2012/0304080 A1 11/2012 Wormald et al.
2012/0307096 A1 12/2012 Ford et al.
2012/0307112 A1 12/2012 Kunishige et al.
2012/0323933 A1 12/2012 He et al.
2013/0006816 A1 1/2013 Nuzzi et al.
2013/0050260 A1 2/2013 Reitan
2013/0057587 A1 3/2013 Leonard et al.
2013/0059607 A1 3/2013 Herz et al.
2013/0060690 A1* 3/2013 Oskolkov ............ G06Q 20/386 705/42
2013/0063369 A1 3/2013 Malhotra et al.
2013/0067027 A1 3/2013 Song et al.
2013/0071093 A1 3/2013 Hanks et al.
2013/0085790 A1 4/2013 Palmer et al.
2013/0128059 A1 5/2013 Kristensson
2013/0145286 A1 6/2013 Feng et al.
2013/0169822 A1 7/2013 Zhu et al.
2013/0173729 A1 7/2013 Starenky et al.
2013/0182133 A1 7/2013 Tanabe
2013/0185131 A1 7/2013 Sinha et al.
2013/0194301 A1 8/2013 Robbins et al.
2013/0198176 A1 8/2013 Kim
2013/0222323 A1 8/2013 Mckenzie
2013/0227476 A1 8/2013 Frey
2013/0232194 A1 9/2013 Knapp et al.
2013/0263031 A1 10/2013 Oshiro et al.
2013/0263251 A1 10/2013 Fleizach et al.
2013/0265450 A1 10/2013 Barnes, Jr.
2013/0290443 A1 10/2013 Collins et al.
2013/0344896 A1 12/2013 Kirmse et al.
2013/0346877 A1 12/2013 Borovoy et al.
2014/0011538 A1 1/2014 Mulcahy et al.
2014/0032682 A1 1/2014 Prado et al.
2014/0047045 A1 2/2014 Baldwin et al.
2014/0047335 A1 2/2014 Lewis et al.
2014/0049652 A1 2/2014 Moon et al.
2014/0052485 A1 2/2014 Shidfar
2014/0052633 A1* 2/2014 Gandhi ................ G06Q 20/386 705/44
2014/0057660 A1 2/2014 Wager
2014/0085334 A1 3/2014 Payne
2014/0089314 A1 3/2014 Iizuka et al.
2014/0122658 A1 5/2014 Haeger et al.
2014/0122787 A1 5/2014 Shalvi et al.
2014/0129953 A1 5/2014 Spiegel
2014/0143143 A1* 5/2014 Fasoli .................. G06Q 20/347 705/44
2014/0149519 A1 5/2014 Redfern et al.
2014/0155102 A1 6/2014 Cooper et al.
2014/0173457 A1 6/2014 Wang et al.
2014/0189592 A1 7/2014 Benchenaa et al.
2014/0201527 A1 7/2014 Krivorot
2014/0207679 A1* 7/2014 Cho ................... G06Q 20/3255 705/44
2014/0214471 A1 7/2014 Schreiner, III
2014/0223372 A1 8/2014 Dostie et al.
2014/0279123 A1 9/2014 Harkey et al.
2014/0279436 A1* 9/2014 Dorsey ................. G06Q 20/10 705/39
2014/0280537 A1 9/2014 Pridmore et al.
2014/0282096 A1 9/2014 Rubinstein et al.
2014/0298210 A1 10/2014 Park et al.
2014/0317302 A1 10/2014 Naik
2014/0325383 A1* 10/2014 Brown .................. G06F 3/0486 715/748
2014/0342758 A1 11/2014 Aleksy et al.
2014/0359024 A1 12/2014 Spiegel
2014/0359032 A1 12/2014 Spiegel et al.
2015/0004934 A1* 1/2015 Qian ..................... H04W 12/06 455/411
2015/0046278 A1 2/2015 Pei et al.
2015/0094106 A1 4/2015 Grossman et al.
2015/0116529 A1 4/2015 Wu et al.
2015/0172534 A1 6/2015 Miyakawa et al.
2015/0222814 A1 8/2015 Li et al.
2015/0287120 A1 10/2015 Davidson
2016/0006927 A1 1/2016 Sehn

FOREIGN PATENT DOCUMENTS

WO WO-2014194262 A2 12/2014
WO WO-2016007285 A1 1/2016

OTHER PUBLICATIONS

"Android Getting Started Guide", Voxer Business, (Feb. 1, 2014), 18 pgs.
"U.S. Appl. No. 14/466,940, Advisory Action mailed Apr. 1, 2015", 2 pgs.
"U.S. Appl. No. 14/466,940, Advisory Action mailed Sep. 13, 2016", 3 pgs.
"U.S. Appl. No. 14/466,940, Advisory Action mailed Dec. 18, 2017", 2 pgs.
"U.S. Appl. No. 14/466,940, Examiner Interview Summary mailed May 2, 2016", 3 pgs.
"U.S. Appl. No. 14/466,940, Examiner Interview Summary mailed Jul. 27, 2015", 3 pgs.
"U.S. Appl. No. 14/466,940, Final Office Action mailed Mar. 3, 2015", 19 pgs.
"U.S. Appl. No. 14/466,940, Final Office Action mailed Aug. 18, 2016", 25 pgs.
"U.S. Appl. No. 14/466,940, Final Office Action mailed Oct. 11, 2017", 16 pgs.
"U.S. Appl. No. 14/466,940, Final Office Action mailed Oct. 30, 2015", 23 pgs.
"U.S. Appl. No. 14/466,940, Non Final Office Action mailed Mar. 28, 2017", 18 pgs.
"U.S. Appl. No. 14/466,940, Non Final Office Action mailed Apr. 8, 2016", 25 pgs.
"U.S. Appl. No. 14/466,940, Non Final Office Action mailed Jul. 10, 2015", 19 pgs.
"U.S. Appl. No. 14/466,940, Non Final Office Action mailed Jul. 20, 2017", 17 pgs.
"U.S. Appl. No. 14/466,940, Non Final Office Action mailed Dec. 12, 2014", 15 pgs.
"U.S. Appl. No. 14/466,940, Notice of Allowance mailed Apr. 20, 2018", 6 pgs.
"U.S. Appl. No. 14/466,940, Response filed Jan. 30, 2015 to Non Final Office Action mailed Dec. 12, 2014", 6 pgs.
"U.S. Appl. No. 14/466,940, Response filed Feb. 28, 2018 to Advisory Action mailed Dec. 18, 2017", 9 pgs.
"U.S. Appl. No. 14/466,940, Response filed Mar. 24, 2015 to Final Office Action mailed Mar. 3, 2015", 7 pgs.
"U.S. Appl. No. 14/466,940, Response filed May 19, 2016 to Non Final Office Action mailed Apr. 8, 2016", 10 pgs.
"U.S. Appl. No. 14/466,940, Response filed May 25, 2017 to Non Final Office Action mailed Mar. 28, 2017", 7 pgs.
"U.S. Appl. No. 14/466,940, Response filed Jul. 31, 2017 to Non Final Office Action mailed Jul. 20, 2017", 6 pgs.
"U.S. Appl. No. 14/466,940, Response filed Aug. 13, 2015 to Non Final Office Action mailed Jul. 10, 2015", 8 pgs.
"U.S. Appl. No. 14/466,940, Response filed Aug. 29, 2016 to Final Office Action mailed Aug. 18, 2016", 6 pgs.
"U.S. Appl. No. 14/466,940, Response filed Nov. 30, 2015 to Final Office Action mailed Oct. 30, 2015", 8 pgs.

(56) References Cited

OTHER PUBLICATIONS

"U.S. Appl. No. 14/466,940, Response filed Dec. 11, 2017 to Final Office Action mailed Oct. 11, 2017", 4 pgs.
"U.S. Appl. No. 15/868,909, Examiner Interview Summary mailed Nov. 30, 2020", 3 pgs.
"U.S. Appl. No. 15/868,909, Final Office Action mailed Jun. 5, 2020", 10 pgs.
"U.S. Appl. No. 15/868,909, Non Final Office Action mailed Sep. 18, 2020".
"U.S. Appl. No. 15/868,909, Non Final Office Action mailed Dec. 31, 2019", 15 pgs.
"U.S. Appl. No. 15/868,909, Notice of Allowance mailed Jan. 22, 2021", 7 pgs.
"U.S. Appl. No. 15/868,909, Response filed Mar. 30, 2020 to Non Final Office Action mailed Dec. 31, 2019", 9 pgs.
"U.S. Appl. No. 15/868,909, Response filed Sep. 8, 2020 to Final Office Action mailed Jun. 5, 2020", 8 pgs.
"U.S. Appl. No. 15/868,909, Response filed Dec. 10, 2020 to Non Final Office Action mailed Sep. 18, 2020", 8 pgs.
"European Application Serial No. 14804343.3, Extended European Search Report mailed Sep. 29, 2016", 12 pgs.
"How Snaps Are Stored and Deleted", Snapchat, [Online] Retrieved from the Internet: <URL: https://www.snap.com/en-US/news/post/how-snaps-are-stored-and-deleted/>, (May 9, 2013), 2 pgs.
"International Application Serial No. PCT/US2014/040346, International Search Report mailed Mar. 23, 2015", 2 pgs.
"International Application Serial No. PCT/US2014/040346, Written Opinion mailed Mar. 23, 2015", 6 pgs.
"International Application Serial No. PCT/US2015/037251, International Search Report mailed Sep. 29, 2015", 2 pgs.
"International Application Serial No. PCT/US2015/037251, Written Opinion mailed Sep. 29, 2015", 4 pgs.
"IVisit Mobile: Getting Started", IVISIT, [Online] Retrieved from the Internet: <URL: http://web.archive.org/web/20140830174355/http://ivisit.com/support_mobile>, (Dec. 4, 2013), 16 pgs.
Fajman, "An Extensible Message Format for Message Disposition Notifications", Request for Comments: 2298, National Institutes of Health, (Mar. 1998), 28 pgs.
Melanson, Mike, "This text message will self destruct in 60 seconds", [Online] Retrieved from the Internet: <URL: http://readwrite.com/2011/02/11/this_text message_will_self_destruct_in_60_seconds>, (Feb. 18, 2015), 4 pgs.
Sawers, Paul, "Snapchat for IOS Lets You Send Photos to Friends and Set How long They're Visible for", [Online] Retrieved from the Internet: <URL: https://thenextweb.com/apps/2012/05/07/snapchat-for-ios-lets-you-send-photos-to-friends-and-set-how-long-theyre-visible-for/>, (May 7, 2012), 5 pgs.
Shein, Esther, "Ephemeral Data", Communications of the ACM, vol. 56, No. 9, (Sep. 2013), 3 pgs.

* cited by examiner

500

MESSAGE PROCESSOR WITH APPLICATION PROMPTS

FIELD OF THE INVENTION

This invention relates generally to communications in a computer network. More particularly, this invention relates to a message processor with application prompts.

BACKGROUND OF THE INVENTION

Electronic messages have become a pervasive form of communication. Frequently, such communications implicate the need for an application that supports a service required by the message sender. Therefore, it would be desirable for one to easily invoke an application from an electronic message.

SUMMARY OF THE INVENTION

A computer implemented method includes identifying a special character in a message generated by a sender. An application prompt is supplied to the sender in response to the special character. An application is invoked in response to activation of the application prompt.

In one example, a computer implemented method includes identifying a special character in a message generated by a sender. A money transfer prompt is supplied to the sender in response to the special character. A transfer amount is validated. An account transfer for the transfer amount is initiated. The message is sent to a recipient with indicia of the account transfer.

In yet another example, a computer implemented method contemplates invoking an application directly from a message thread interface, without a requirement of navigating away from the message thread interface.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
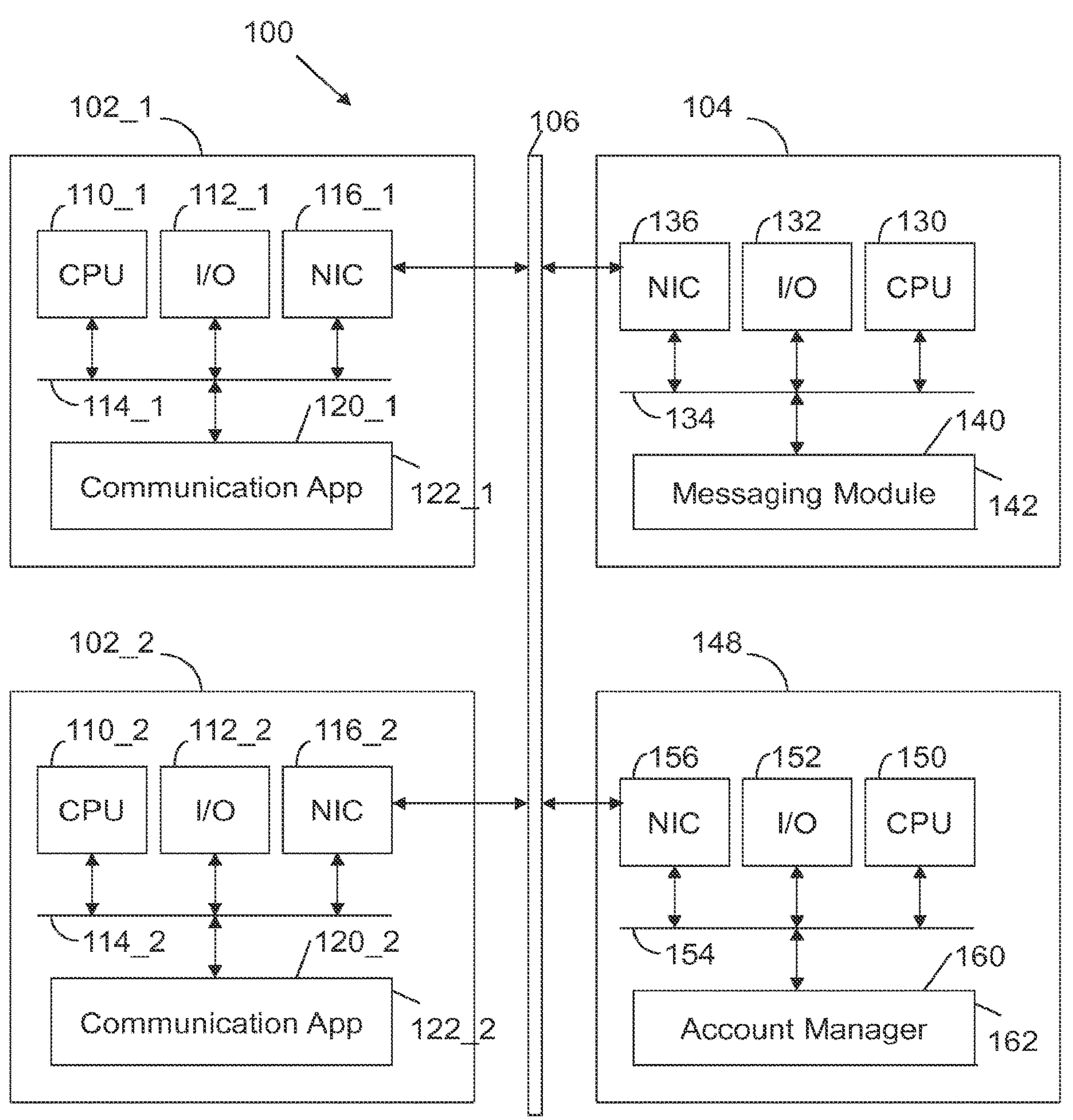
FIG. 1 illustrates a system configured in accordance with an embodiment of the invention.

FIG. 1 illustrates a system 100 configured in accordance with an embodiment of the invention. The system 100 includes a first client device 102_1 and a second client device 102_2. The client devices 102 may be used to exchange messages via a server 104 and network 106, which may be any combination of wired and wireless networks. Server 104 communicates with server 148 via network 106 to coordinate account transfers, as discussed below.

Each client device 102 includes standard components, such as a central processing unit 110 and input/output devices 112 connected via a bus 114. The input/output devices 112 may include a touch display, keyboard and the like. A network interface circuit 116 is also connected to the bus 114 to coordinate communications over network 106. A memory 120 is also connected to the bus 114. The memory 120 stores a communication application 122. The communication application 122 is a messaging application that coordinates the exchange of messages via server 104. The messages may be text messages, pictures or videos (with or without associated text), and the like. Each client device 102 may be a smartphone, tablet, wearable device, PC, and the like.

The server 104 also includes standard components, such as a central processing unit 130, input/output devices 132, a bus 134 and a network interface circuit 136. A memory 140 connected to the bus 134 store a messaging module 142. The messaging module stores instructions that are executed by the central processing unit 130 to implement operations of the invention. The messaging module 142 supports the exchange of electronic messages and coordinates account transfers that are initiated from electronic messages.

Server 148 also includes standard components, such as a central processing unit 150, input/output devices 152, a bus 154 and a network interface circuit 156. A memory 160 stores an account manager 162. The account manager 162 includes executable instructions to maintain account information and account balances. The account manager 162 includes an interface, such as an application program interface, which supports online account transfers. The messaging module 142 communicates with the account manager 162 to initiate such online account transfers from electronic messages, as demonstrated in connection with FIG. 2.

Figure 2:
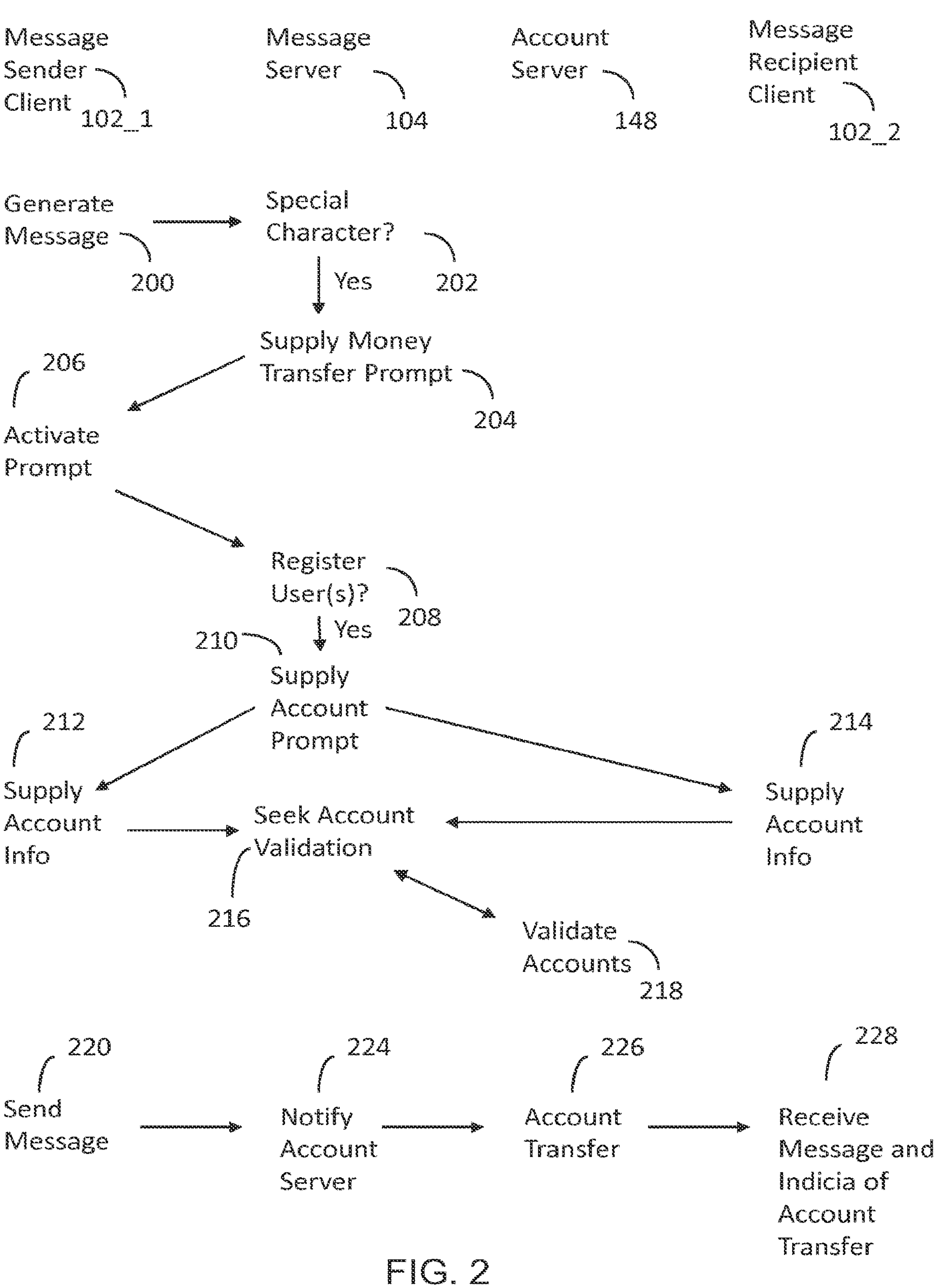
FIG. 2 illustrates processing operations associated with an embodiment of the invention.
Figure 3:
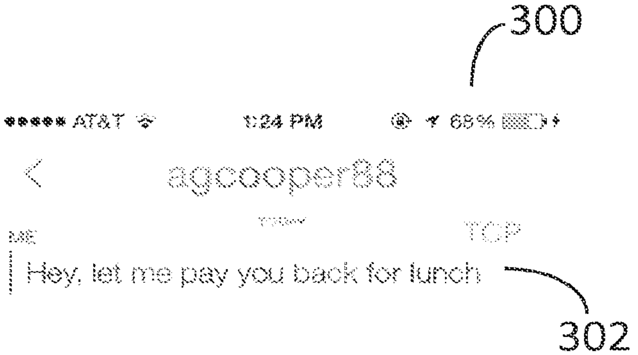
FIG. 3 illustrates a message interface that may be used in accordance with an embodiment of the invention.
Figure 3:
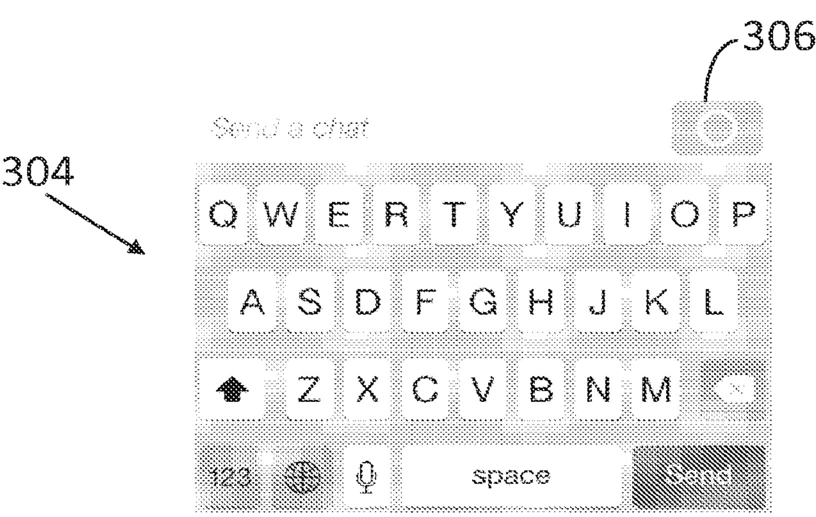

FIG. 2 illustrates interactive operations performed by the components of FIG. 1. Initially, a message is generated 200 at a client device, such as a message sender client 102_1. FIG. 3 illustrates a user interface 300 for a messaging application. The figure illustrates a text message 302 generated from keyboard 304. Adjacent to the keyboard is a message functionality prompt 306. In this case, activating the prompt invokes a photograph or video mode. Thus, one can send a message with a photo or video with or without accompanying text.

Figure 4:
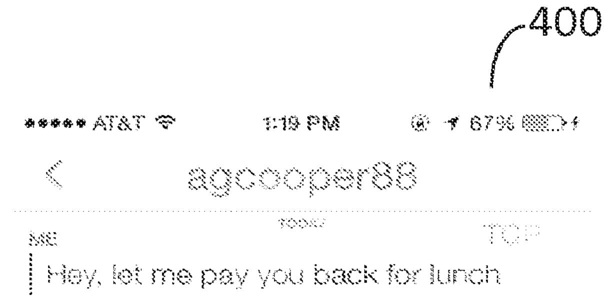
FIG. 4 illustrates an account transfer prompt utilized in accordance with an embodiment of the invention.
Figure 4:

Returning to FIG. 2, the message server checks for a special character (which may include a single character or string of characters) in the message 202. For example, the special character may be a dollar sign or other designated keyboard character. If the character is present, then a money transfer prompt is supplied 204. In other embodiments, the message server may check for a valid dollar amount coupled with the dollar sign. FIG. 4 illustrates an interface 400 with a dollar sign 402 entered by the user. The presence of the special character results in a money transfer prompt 404 being supplied by the messaging module 142 of the message server 104. Observe that simply typing the special character allows one to initiate a financial transaction directly from a message. This circumvents the need to log into a separate web portal to define a financial transaction. Instead, the financial transaction is initiated directly from the message.

The next processing operation of FIG. 2 occurs at the message sender client 102_1, where the user activates the prompt 206. A check is made at the message server 104 to determine whether the user is registered 208. More particularly, the message server determines whether the message sender and message recipient have accounts that will allow for an account transfer. If registration is required, an account prompt is supplied 210 to the sender client 102_1 and/or the recipient client 102_2.

Figure 5:
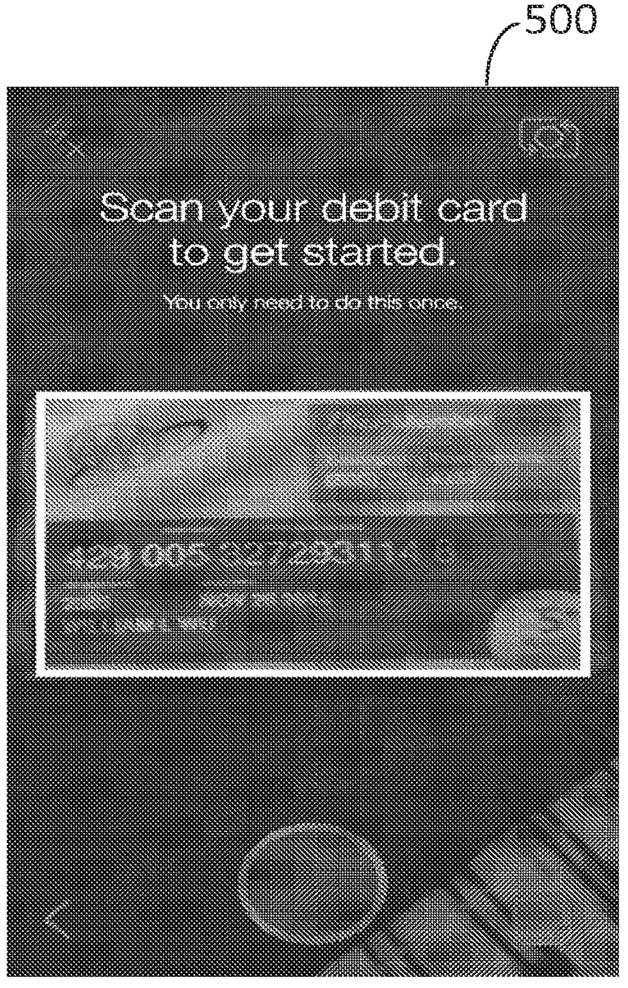
FIG. 5 illustrates an account information prompt utilized in accordance with an embodiment of the invention.

FIG. 5 illustrates an interface 500 that prompts a user to scan a debit or credit card. That is, the user is prompted to take a digital photograph of the card using the camera associated with the client device (or to use their camera to "hover over" the card number). Alternately, the prompt may solicit the sender to enter an account number. In the case of a digital photograph, the message server 104 uses an optical character recognition (OCR) analysis or machine vision analysis to decipher the account number. Either analysis may be augmented with prompts to the user to confirm the accuracy of the deciphered account number. Thus, a number is presented to the user, which may be edited by the user to correct errors arising from the analysis process.

Returning to FIG. 2, the account information is supplied by the sender 212 or recipient 214. The account information is then validated 216. That is, the message server 104 communicates with the account server 148 to validate accounts 218. The validation includes validation that the sender has sufficient finds for the account transfer. If the sender and recipient are already registered, then activation of the prompt 206 leads immediately to the seeking of account validation 216.

Figure 6:
FIG. 6 illustrates a message with indicia of an account transfer.
Figure 6:
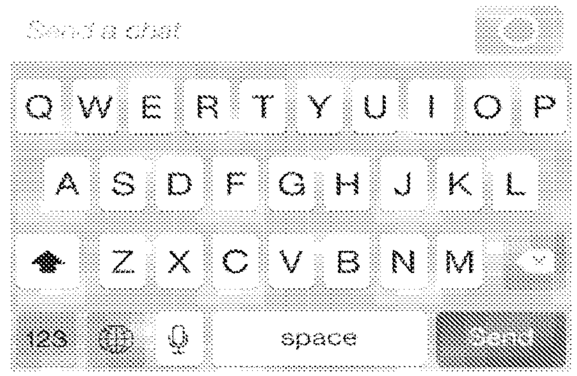

The message sender sends the message 220. The message server 104 coordinates message delivery and notifies the account server 224. The account server 148 executes the account transfer 226. The message is then received 228 at the recipient client 102_2. The message includes indicia of the account transfer. FIG. 6 illustrates an interface 600 with a message 602 and indicia of an account transfer 604.

In another aspect of the invention, arithmetic or calculator operations may be implemented as part of and in conjunction with the process of the instant invention. For example, the process of the invention may be implemented to recognize certain symbols upon which certain operations are performed. For instance, symbols such as "+", "−", "/" may trigger an arithmetic operation, thereby facilitating the division of a meal expense among the number of people at a meal, etc.

Thus, it can be appreciated that the invention provides an easy mechanism to effectuate a financial transaction directly from a message. The financial transaction is initiated from a message, not by a separate process of logging into a financial portal. Thus, the messaging application provides enhanced user functionality.

Figure 7:
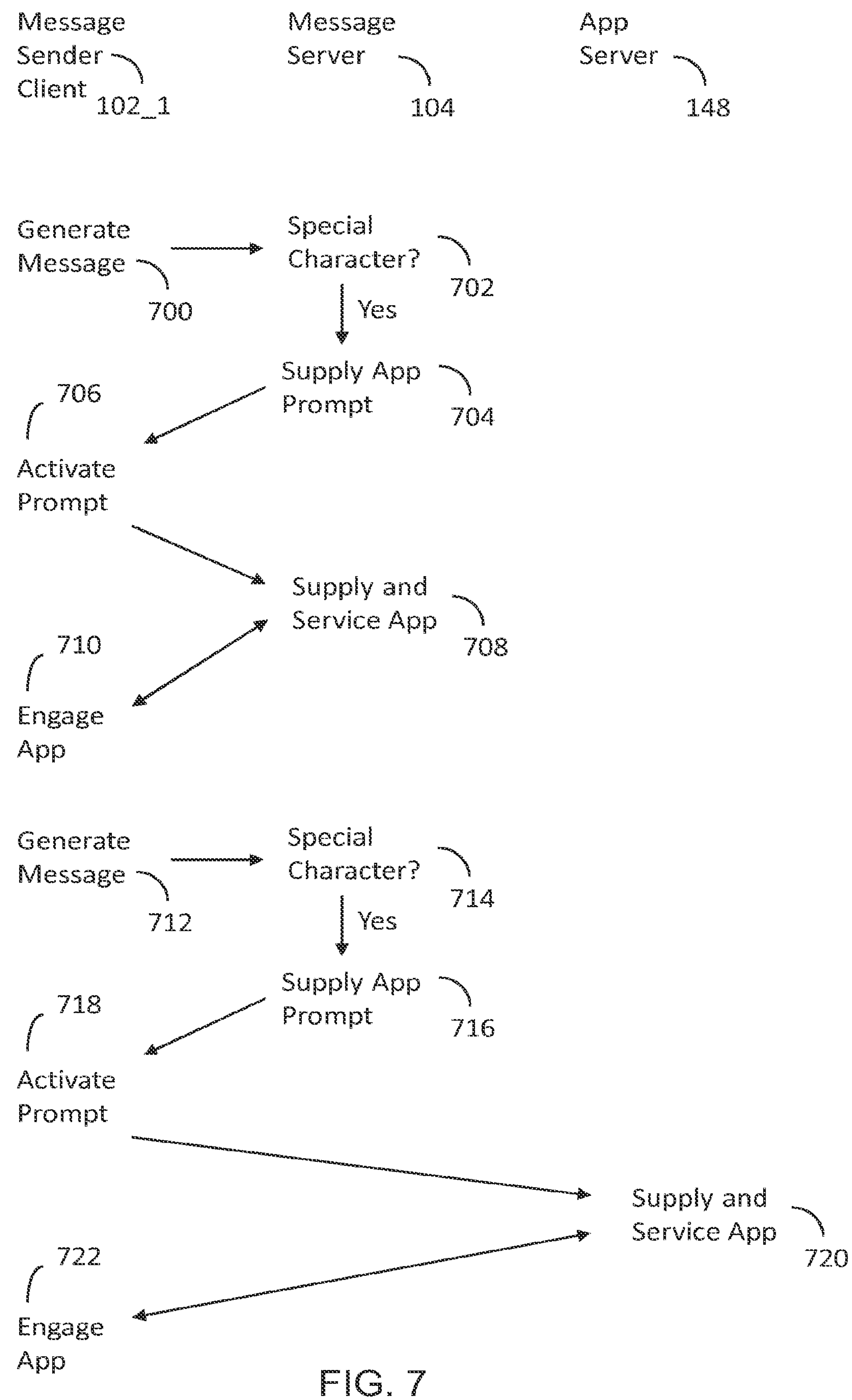
FIG. 7 illustrates processing operations associated with an alternate embodiment of the invention.

An alternate embodiment of the invention is depicted in FIG. 7. A message sender client 102_1 generates a message 700. The message server 104 determines if a special character is present 702. For example, the special character may be a hash tag (#), which invokes a map application. Alternately, the special character may be a percentage sign (%), which invokes a calculator application. Like with other embodiments described herein, a series of characters or characters coupled with a special character may be used to invoke an application. Examples include "#HERE" or "HERE" for invoking a map application (where a user can obtain or send directions to a location) or "+CAL" for invoking a calendar function (where a user can create a calendar event).

Another example could include ecommerce applications. For example, "#GIFT" could be used to launch a process whereby a user may purchase a gift for another user. In this embodiment, upon detecting the special character "#GIFT", the user is prompted to take a picture of a barcode associated with a purchasable item or service. After recognizing the barcode (and the item to be purchased), the user may confirm or push a send button, which results in the item or service being sent to the user's recipient. An associated debit may then be made to the user's account.

In an alternative ecommerce example, "$FOOD" or "$PIZZA" could be used to order food service delivery. Upon detecting the special character, a geolocation feature could be used to identify nearby restaurants available for delivery. Tapping the button could launch one or more menus and/or order flow screens. In this example, the cost of food could be split between the user and recipient or charged entirely to the user. The food would then be delivered to the user based on profile information or alternatively according to geolocation information.

Yet another example could relate to people in a user's contact list. For example, "@" coupled with a contact name could invoke one or more other applications. One example includes adding the identified contact to a chat. Another example includes adding an image or picture of the contact to the chat.

It should be recognized that numerous other character and application pairs may be implemented within the present invention. In addition, the characters and associated applications may be customizable according to each user's individual preferences. For example, a user may choose to customize the "#GIFT" character to invoke a gift registry application, which adds an item or service to a list of items the user would like to receive as a gift.

Returning to FIG. 7, if a special character is present (702—Yes), then an application prompt is supplied 704. If the message sender client 102_1 activates the prompt 706, the application is supplied and serviced 708 at the message sever 104. For example, the message server 104 may supply and service a calculator application in response to engagement of the application 710 at the message sender client 102_1.

The message sender client 102_1 may generate another message 712 with a different special character. If the special character is present (714—Yes), an application prompt is supplied 716. Activation of the prompt 718 by the message sender client 102_1 may invoke a third-party application, such as a map service supported by an application server 148. The application server 148 supplies and services the application 720 in response to engagement of the application 722 at the message sender client 102_1.

Numerous other embodiments are possible. In addition, series of characters or text may be used in addition to special characters to invoke applications or operations. For example, the text string "www" may be recognized as a URL, upon which a screenshot of the website may be presented to the user. The user may then annotate or add text to the screenshot and subsequently forward to a recipient.

Thus, it can be seen that aspects of the present invention allow an application to be invoked directly from a message thread interface, without a requirement of navigating away from the message thread interface.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to:

magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed: obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer implemented method, comprising:

causing display of a messaging thread interface at a user device;

associating, based on customized input from a user associated with the user device, a first special character with a financial application;

associating, based on the customized input from the user associated with the user device, a second special character with a second application;

detecting the first special character in a first message generated by the user on the user device within the messaging thread interface;

in response to detecting the first special character within the first message generated by the user within the messaging thread interface, causing display of an icon associated with the financial application within the messaging thread interface while maintaining display of the messaging thread interface, wherein the icon associated with the financial application is configured to generate a money transfer prompt for the user, and wherein the financial application is configured to validate a transfer amount, initiate an account transfer for the transfer amount, and send the first message to a recipient with indicia of the account transfer;

detecting the second special character in a second message generated by the user via the messaging thread interface;

in response to detecting the second special character, causing display of a sub-interface associated with the second application from the messaging thread interface, wherein the second application is selected from among a plurality of applications, and wherein the second application is distinct from the financial application; and displaying the second application within the messaging thread interface while maintaining display of the messaging thread interface.

2. The computer implemented method of claim 1, wherein sending the first message to the recipient comprises supplying, to a messaging application running on a second user device of a second user, the first message.

3. The computer implemented method of claim 1, wherein initiating the account transfer comprises using an account number for the account transfer and wherein the account number is generated via a picture scan taken by the user device.

4. The computer implemented method of claim 1, wherein initiating the account transfer comprises using an account number for the account transfer and wherein the account number is used to determine if the user is a registered user.

5. The computer implemented method of claim 1, further comprising:

supplying an account prompt to register the user;

prompting the user to scan a payment card using a camera of the user device;

deciphering an account number from the scanned payment card;

presenting the account number to the user for confirmation; and communicating with an account server to validate an account associated with the account number.

6. The computer implemented method of claim 1, further comprising:

detecting arithmetic operators in the first message; and performing calculations based on the arithmetic operators.

7. The computer implemented method of claim 1, wherein launching the second application further comprises:

determining a geolocation of the user device;

identifying at least one food service provider near the geolocation;

displaying a menu from the food service provider;

processing an order; and initiating delivery of the order.

8. The computer implemented method of claim 1, wherein launching the second application further comprises:

prompting the user to take a picture of a barcode associated with an item;

analyzing the barcode to identify the item; and initiating a transaction related to the item.

9. The computer implemented method of claim 1, wherein launching the second application further comprises:

detecting a contact identifier; and displaying an image associated with the contact identifier in the messaging thread interface.

10. The computer implemented method of claim 1, wherein launching the second application further comprises:

detecting a location command in the second message; and enabling obtaining or sending of directions based on information in the second message.

11. The computer implemented method of claim 1, wherein launching the second application further comprises:

detecting a calendar command in the second message; and enabling creation of a calendar event based on information in the second message.

12. The computer implemented method of claim 1, wherein the plurality of applications comprises one or more of a map application, a calculator application, a calendar application, an ecommerce application, or a contact management application.

13. A system comprising:

at least one processor; and memory including instructions that, when executed by the at least one processor, cause the at least one processor to perform operations comprising:

causing display of a messaging thread interface at a user device;

associating, based on customized input from a user associated with the user device, a first special character with a financial application;

associating, based on the customized input from the user associated with the user device, a second special character with a second application;

detecting the first special character in a first message generated by the user on the user device within the messaging thread interface;

in response to detecting the first special character within the first message generated by the user within the messaging thread interface, causing display of an icon associated with the financial application within the messaging thread interface while maintaining display of the messaging thread interface, wherein the icon associated with the financial application is configured to generate a money transfer prompt for the user, and wherein the financial application is configured to validate a transfer amount, initiate an account transfer for the transfer amount, and send the first message to a recipient with indicia of the account transfer;

detecting the second special character in a second message generated by the user via the messaging thread interface;

in response to detecting the second special character, causing display of a sub-interface associated with the second application from the messaging thread interface, wherein the second application is selected from among a plurality of applications, and wherein the second application is distinct from the financial application; and displaying the second application within the messaging thread interface while maintaining display of the messaging thread interface.

14. The system of claim 13, wherein initiating the account transfer comprises using an account number for the account transfer and wherein the account number is generated via a picture scan taken by the user device.

15. The system of claim 13, wherein initiating the account transfer comprises using an account number for the account transfer and wherein the account number is used to determine if the user is a registered user.

16. The system of claim 13, the operations further comprising:

supplying an account prompt to register the user;

prompting the user to scan a payment card using a camera of the user device;

deciphering an account number from the scanned payment card;

presenting the account number to the user for confirmation; and communicating with an account server to validate an account associated with the account number.

17. The system of claim 13, the operations further comprising:

detecting arithmetic operators in the first message; and performing calculations based on the arithmetic operators.

18. At least one non-transitory computer-readable storage medium, the at least one non-transitory computer-readable storage medium including instructions that when executed by a computing system, cause the computing system to perform operations comprising:

causing display of a messaging thread interface at a user device;

associating, based on customized input from a user associated with the user device, a first special character with a financial application:

associating, based on the customized input from the user associated with the user device, a second special character with a second application;

detecting the first special character in a first message generated by the user on the user device within the messaging thread interface;

in response to detecting the first special character within the first message generated by the user within the messaging thread interface, causing display of an icon associated with the financial application within the messaging thread interface while maintaining display of the messaging thread interface, wherein the icon associated with the financial application is configured to generate a money transfer prompt for the user, and wherein the financial application is configured to validate a transfer amount, initiate an account transfer for the transfer amount, and send the first message to a recipient with indicia of the account transfer;

detecting the second special character in a second message generated by the user via the messaging thread interface;

in response to detecting the second special character, causing display of a sub-interface associated with the second application from the messaging thread interface, wherein the second application is selected from among a plurality of applications, and wherein the second application is distinct from the financial application; and displaying the second application within the messaging thread interface while maintaining display of the messaging thread interface.

* * * * *